(12) United States Patent
Yamamoto et al.

(10) Patent No.: US 7,621,974 B2
(45) Date of Patent: * Nov. 24, 2009

(54) BONDING STRUCTURE AND BONDING METHOD FOR CEMENTED CARBIDE ELEMENT AND DIAMOND ELEMENT, CUTTING TIP AND CUTTING ELEMENT FOR DRILLING TOOL, AND DRILLING TOOL

(75) Inventors: Kazuo Yamamoto, Naka-Gun (JP); Tadakazu Ohashi, Hitachinaka (JP); Akhmadi Wardoyo, Naka-Gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 11/691,846

(22) Filed: Mar. 27, 2007

(65) Prior Publication Data

US 2007/0187154 A1 Aug. 16, 2007

Related U.S. Application Data

(62) Division of application No. 10/628,134, filed on Jul. 25, 2003, now Pat. No. 7,261,753.

(30) Foreign Application Priority Data

| Jul. 26, 2002 | (JP) | ............................. 2002-217433 |
| Mar. 27, 2003 | (JP) | ............................. 2003-088130 |
| Mar. 27, 2003 | (JP) | ............................. 2003-088131 |
| Mar. 27, 2003 | (JP) | ............................. 2003-088132 |

(51) Int. Cl.
*C04B 37/00* (2006.01)

(52) U.S. Cl. ........................ 51/307; 51/309; 407/117; 407/119

(58) Field of Classification Search .................. 51/307, 51/309; 407/117, 119
See application file for complete search history.

(56) References Cited

U.S. PATENT DOCUMENTS

| 4,403,015 A | * | 9/1983 | Nakai et al. ................. 428/698 |
| 4,457,765 A | | 7/1984 | Wilson et al. |
| 4,593,776 A | * | 6/1986 | Salesky et al. ............. 76/108.2 |

(Continued)

FOREIGN PATENT DOCUMENTS

EP    0 001 184 A    3/1979

(Continued)

OTHER PUBLICATIONS

Patent Abstracts of Japan for JP2000-2073 published Jan. 7, 2000.

(Continued)

*Primary Examiner*—Archene Turner
(74) *Attorney, Agent, or Firm*—Darby & Darby P.C.

(57) ABSTRACT

A cutting tip for a drilling tool includes a cemented carbide cutting base, a diamond element supported by the cutting base, and a bonding layer formed between the cutting base and the diamond element in order to bond them. The bonding layer includes diffusion layers and in which one or two or more metals selected from a group consisting of Fe, Ni, Co, Ti, Zr, W, V, Nb, Ta, Cr, Mo, and Hf diffuses into at least one of the diamond or the cement carbide.

5 Claims, 10 Drawing Sheets

U.S. PATENT DOCUMENTS

| | | | | |
|---|---|---|---|---|
| 4,919,220 A * | 4/1990 | Fuller et al. | ............... | 175/433 |
| 5,151,107 A * | 9/1992 | Cho et al. | ............... | 51/295 |
| 5,173,089 A * | 12/1992 | Tanabe et al. | ............... | 51/309 |
| 5,273,557 A * | 12/1993 | Cerutti et al. | ............... | 51/309 |
| 5,337,844 A * | 8/1994 | Tibbitts | ............... | 51/293 |
| 5,429,199 A * | 7/1995 | Sheirer et al. | ............... | 175/431 |
| 6,132,675 A * | 10/2000 | Corrigan et al. | ............... | 419/11 |
| 6,248,447 B1 | 6/2001 | Griffin et al. | | |
| 6,344,149 B1 * | 2/2002 | Oles | ............... | 216/11 |
| 6,358,624 B1 * | 3/2002 | Yoshida et al. | ............... | 51/307 |
| 6,500,226 B1 * | 12/2002 | Dennis | ............... | 75/240 |
| 6,544,308 B2 * | 4/2003 | Griffin et al. | ............... | 428/408 |
| 7,261,753 B2 * | 8/2007 | Yamamoto et al. | ............... | 51/309 |

FOREIGN PATENT DOCUMENTS

| | | | |
|---|---|---|---|
| EP | 402671 | * | 6/1989 |
| JP | 56-139840 | | 10/1981 |
| JP | 62-156461 | | 10/1987 |
| JP | 4-74766 A1 | | 3/1992 |
| JP | 04-114966 | * | 4/1992 |
| JP | 04-149076 | | 5/1992 |
| JP | 2000-000686 A1 | | 1/2000 |
| JP | 2000-2073 A | | 1/2000 |
| JP | 2001-241285 | | 9/2001 |
| WO | WO-98/32312 A1 | | 7/1998 |

OTHER PUBLICATIONS

European Search Report for EP 03 01 6598 completed Nov. 30, 2005.

* cited by examiner

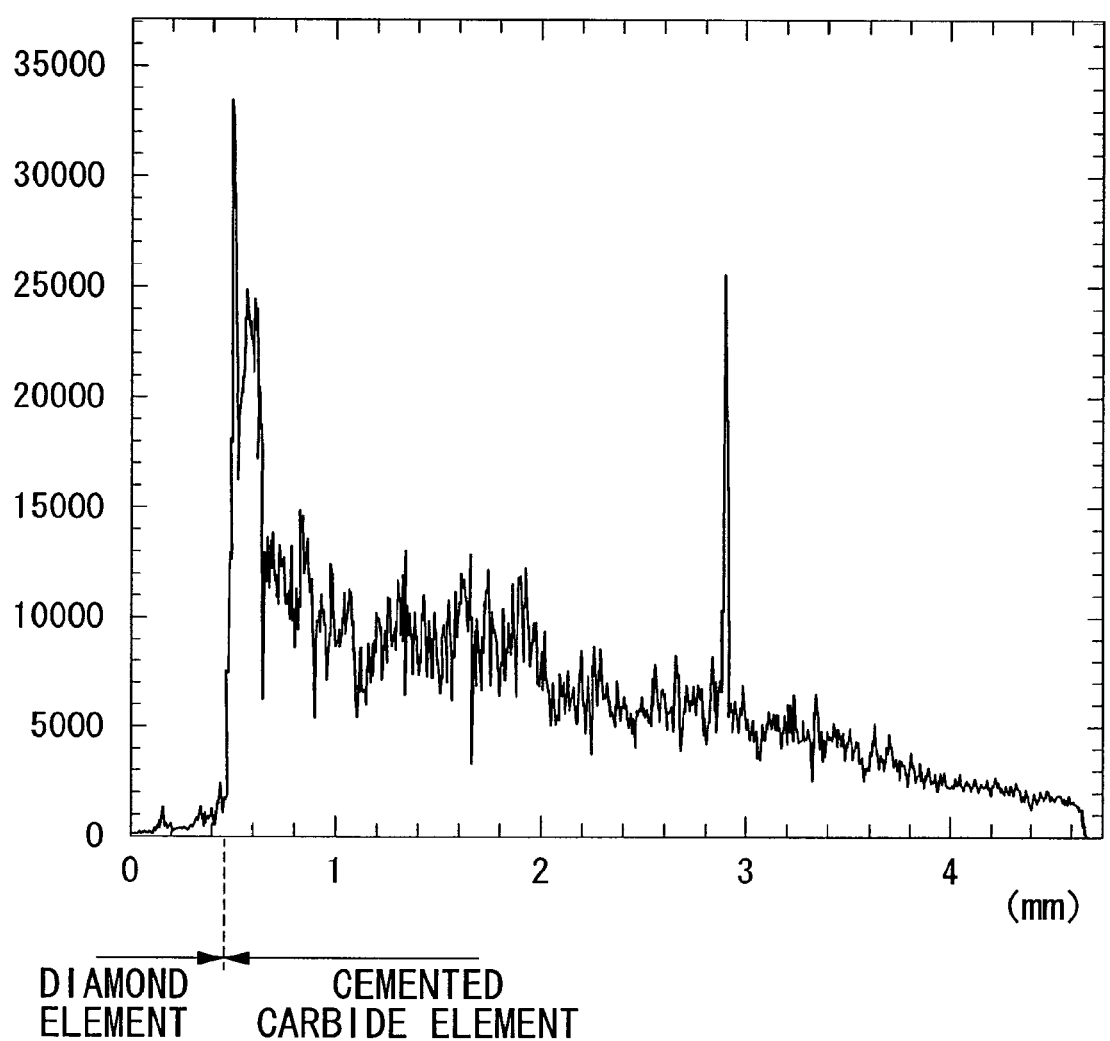

BONDING STRUCTURE AND BONDING METHOD FOR CEMENTED CARBIDE ELEMENT AND DIAMOND ELEMENT, CUTTING TIP AND CUTTING ELEMENT FOR DRILLING TOOL, AND DRILLING TOOL

CROSS-REFERENCE TO PRIOR APPLICATION

This application is a divisional of U.S. patent application Ser. No. 10/628,134, filed Jul. 25, 2003, now U.S. Pat. No. 7,261,753 which claims the benefit of Japanese Patent Application Nos. 2002-217433, filed Jul. 26, 2002, 2003-088130, filed Mar. 27, 2003, 2003-088131, filed Mar. 27, 2003, and 2003-088132, filed Mar. 27, 2003, all of which are incorporated by reference in their entirety.

BACKGROUND OF THE INVENTION

1. Field of the Invention

The present invention relates to a bonding method and bonding structure between a cemented carbide element and a diamond element. In addition, the present invention relates to a cutting tip, cutting element, and a drilling tool for drilling a well (winze) or the like.

2. Description of the Related Art

Drilling tools are used to drill oil wells and other types of wells. As one such type of drilling tool, a drilling tool is known in which posts made of superhard tungsten carbide alloy (below, referred to as "cemented carbide posts") are attached to the distal surface of an iron alloy tool body in a predetermined arrangement by methods such as brazing and shrinkage fitting, and cutting tips consisting of ultrahigh pressure sintered diamond (below, referred to as "sintered diamond") are brazed to each of these cemented carbide posts. The drilling tool is mounted on the distal end of a pipe, the pipe is rotated while applying a weight via the pipe in the drilling direction, and thereby drilling is carried out by the cutting tips provided on the tool body.

Because the wettability of the sintered diamond that forms the cutting tip with respect to the brazing filler metal is low, brazing using a standard brazing filler metal is difficult. In the drilling tool disclosed in Japanese Unexamined Patent Application, First Publication, No. 2000-000686, an Au alloy brazing filler metal (melting point, 940° C.) having a composition including, for example, Cu at 20 to 40% by mass and Ti at 0.5 to 10% by mass, with the remainder consisting of Au and unavoidable impurities, is used in order to braze a cutting tip to a cemented carbide post. In addition, U.S. Pat. No. 6,248,447B1 discloses a drilling tool in which cutting tips are formed by high heat resistant sintered diamond.

In recent years, requirements for labor saving, energy saving, and cost reduction in the drilling operation are increasingly severe. For example, because the operating cost for one day during drilling operations for development drilling for petroleum and the like is extremely high, it is necessary to complete the drilling operation in a short time period by increasing the drilling speed in order to reduce costs.

In order to increase the drilling speed, both the load applied to the tool body and the rotation speed of the tool body should be increased. However, in both of these cases, a heavier load is applied to the cutting tips. The cemented carbide posts made of cemented carbides and the cutting tips made of sintered diamond are bonded by the brazing described above, and this bonding strength is not very high. Therefore, when an extremely heavy load is applied to the cutting tips, the cutting tips may break off from the cemented carbide posts. In addition, when the drilling becomes high-speed, the heat due to drilling becomes high, and thereby it is possible that the cutting tips will break off from the cemented carbide posts because the brazing filler metal used to braze the cutting tip can melt. Thus, conventionally it has not been possible use an extremely high drilling speed.

In consideration of the problems described above, it is an object of the present invention to increase the bonding strength between the cemented carbide element and the diamond element.

SUMMARY OF THE INVENTION

A first aspect of the present invention is a bonding structure between a cemented carbide element and a diamond element. This bonding structure provides a cemented carbide element, a diamond element, and a bonding layer that is formed between the cemented carbide element and the diamond element in order to bond them. This bonding layer includes a diffusion layer in which at least one or two or more metals selected from a group consisting of Fe, Ni, Co, Ti, Zr, W, V, Nb, Ta, Cr, Mo, or Hf diffuses into at least one of the cemented carbide or the diamond.

According to this bonding structure, the cemented carbide element and the diamond element are bonded more strongly because the bonding layer includes the diffusion layer, and thereby the bonding strength between the cemented carbide element and the diamond element is increased, and separation becomes difficult. Moreover, applicability of the bonding structure of the present invention is not limited to drilling tools, and can be used in any field in which bonding between a diamond element and a cemented carbide element can be used.

The thermal expansion rates of the cemented carbide element and the diamond element are different. However, a relatively flexible bonding layer is formed therebetween, and this bonding layer absorbs the stress applied to the diamond element. Therefore, when returning to normal temperature and pressure after heat treatment during bonding, the stress that accumulates in the cemented carbide element and the diamond element is absorbed by this bonding layer, the stress concentrates in the diamond element with difficulty, and cracks or the like occur in the diamond element with difficulty.

The bonding layer can include a diffusion layer in which at least one of Fe and Ni diffuses into diamond. Due to the favorable diffusion of Fe and Ni into the diamond element and the cemented carbide element, a deep and relatively thick diffusion layer in the diamond element and the cemented carbide element can be formed. Therefore, there are the advantages that the stress caused by the impact applied during drilling can be easily relieved and cracks and the like occur with difficulty.

The bonding layer can include a diffusion layer in which Co diffuses into the diamond, and a Co layer. Co is also an element that diffuses easily into the diamond element and the cemented carbide element, but the diffusion layer is hard. Thus, if the Co layer is caused to remain by not allowing the entire amount of the Co to diffuse, a cracking prevention effect and a impact relief effect can be obtained.

The bonding layer can include a diffusion layer in which one or two or more metals selected from a group consisting of Ti, Zr, W, V, Nb, Ta, Cr, Mo, and Hf diffuse into at least one of the cemented carbide or the diamond. Although the diffusion of these metals into the diamond element and the cemented carbide element is not very extensive, an advantageous bonding strength can be obtained. In addition, in the case of these metals, a hard carbide is formed between the metal and the diamond, and thus the bonding strength is increased because of this factor as well.

The diamond can be a high heat resistant sintered diamond including a binder phase of 0.1 to 15% by volume, where this binder phase is formed by one or two or more selected from the group consisting of carbonates of Mg, Ca, Sr, and Ba, oxides of Mg, Ca, Sr, and Ba, complex carbonates and complex oxide containing two or more thereof. In this case, it is possible to increase the heat resistance of the diamond. Bonding of the high heat resistant sintered diamond to a cemented carbide element using a standard brazing filler metal is difficult, but according to the structure of the present invention, a high bonding strength can be obtained. Furthermore, in the present invention, it is possible to use a standard sintered diamond that includes cobalt.

When the cross-section in the transverse direction of the bonding layer is line analyzed using EPMA, the maximum value of the content of the metals in this cross-section is preferably 20 times or greater than the average value of the content of the metal in the region of the cemented carbide element not influenced by the diffusion, and 100 times or greater than the average value of the content of the metal in the region of the diamond element not influenced by the diffusion. In this case, the bonding strength is increased due to the diffusion layer, and at the same time the impact relief effect due to the bonding layer is advantageous.

Another aspect of the present invention is a boding method for a cemented carbide element and a diamond element. This bonding method includes a step in which a metal material including one or two or more metals selected from a group consisting of Fe, Ni, Co, Ti, Zr, W, V, Nb, Ta, Cr, Mo, and Hf is interposed between the cemented carbide element and the diamond element, and a step in which the cemented carbide element, the diamond element, and the metal material are heated, a diffusion layer is formed in which the metal diffuses into at least one of the cemented carbide element or the diamond element, and the cemented carbide element and the diamond element are bonded.

The metal material can be a metal foil, metal powder, metal fibers, or a compound of metals. In brief, any form is suitable as long as the metal material is thin, has a substantially uniform thickness, and can be interposed between the cemented carbide element and the diamond element. This does not depend on the species of metal.

According to this bonding method, it is possible to bond at a high bonding strength a diamond element and a cemented carbide element, which are naturally difficult to bond.

The metal material can include at a total of 70% by mass at least one of Fe and Ni. In this case, in the step for bonding the cemented carbide element and the diamond element, preferably heating is carried out under conditions A (K) and B (GPa) that satisfy the following two equations simultaneously, and a diffusion layer is formed by at least one of Fe and Ni diffusing into the diamond. The formula for B is a simplified Barman-Simon equation.

$A > 1175$ $B > 0.0027 \times A + 0.81$

The metal material can include Co at 70% by mass or greater. In this case, in the step of bonding the cemented carbide element and the diamond element, preferably heating is carried out under conditions A (K) and B (GPa) that satisfy the following two equations simultaneously, and a diffusion layer is formed by Co diffusing into the cemented carbide, and a Co layer is formed.

$A > 1175$ $B > 0.0027 \times A + 0.81$

The metal material can include at 70% by mass or greater one or two or more of the metals selected from the group consisting of Ti, Zr, W, V, Nb, Ta, Cr, Mo, or Hf. In this case, in the step of bonding the cemented carbide element and the diamond element, preferably heating is carried out under conditions A (K) and B (GPa) that satisfy the following two equations simultaneously, and a diffusion layer is formed by the metal diffusing into at least one of the cemented carbide or the diamond.

$A > 1175$ $B > 0.0027 \times A + 0.81$

The diamond can be a high heat resistant sintered diamond including a binder phase of 0.1 to 15% by volume, where this binder phase is formed by one or two or more selected from the group consisting of carbonates of Mg, Ca, Sr, and Ba, oxides of Mg, Ca, Sr, and Ba, complex carbonates and complex oxide containing two or more thereof. Bonding of the high heat resistant sintered diamond to a cemented carbide element using a standard brazing filler metal is difficult, but according to the method of the present invention, a high bonding strength can be obtained. Furthermore, in the present invention, it is possible to use a standard sintered diamond that includes cobalt.

The metal material can have a first layer and a third layer that include Ni at 70% by mass or greater and a second layer interposed between the first layer and the third layer. The second layer includes at 70% by mass or greater carbon. In the step of bonding the cemented carbide element and the diamond element, preferably heating is carried out under conditions A (K) and B (GPa) that satisfy the following two equations simultaneously, and a diffusion layer is formed by the Ni diffusing into the diamond of the diamond element.

$A > 1175$ $B > 0.0027 \times A + 0.81$

In this case, the metal material can include Ni at 55 to 80% by mass as a whole and carbon in total at 20 to 45% by mass.

Another aspect of the present invention is a cutting tip for a drilling tool. This cutting tip includes a cemented carbide cutting base mounted on the post of the tool body of the drilling tool, a diamond element supported by the cutting base, and a bonding layer formed between the cutting base and the diamond element in order to bond them. The bonding layer includes a diffusion layer in which one or two or more metals selected from a group consisting of Fe, Ni, Co, Ti, Zr, W, V, Nb, Ta, Cr, Mo, and Hf diffuses onto at least one of the cemented carbide or the diamond. Other constituents are identical to those of the aspects described above.

Another aspect of the present invention is a cutting element for the drilling tool. This cutting element includes a cemented carbide post mounted on the tool body of the drilling tool, a diamond element supported by the post, and a bonding layer formed between the post and the diamond element in order to bond them. The bonding layer includes a diffusion layer in which one or two or more metals selected from a group consisting of Fe, Ni, Co, Ti, Zr, W, V, Nb, Ta, Cr, Mo, and Hf diffuses onto at least one of the cemented carbide or the diamond.

A cutting element for another drilling tool of the present invention includes a cemented carbide post mounted on the tool body of the drilling tool, and any of the cutting tips described above, and the cutting base of the cutting tip is mounted on the post.

A cutting tip for another drilling tool of the present invention includes a cutting base mounted on the post of the tool body of the drilling tool, a diamond element supported by the cutting base, and a bonding layer formed between the cutting base and the diamond element in order to bond them. The diamond element can be a high heat resistant sintered diamond including a binder phase of 0.1 to 15% by volume, where this binder phase is formed by one or two or more selected from the group consisting of carbonates of Mg, Ca, Sr, and Ba, oxides of Mg, Ca, Sr, and Ba, complex carbonates and complex oxide containing two or more thereof. A tungsten carbide cemented carbide that includes Co as a binding agent forms the cutting base, and the diffusion layer includes at least one of Ni or Fe.

An installation site is formed on the cutting base, where this installation site has a pair of support surfaces facing towards the leading edge in the drilling direction with a space opened therebetween. The diamond element can have a shape conforming to that of the installation site, and is attached therein. In this case, the diamond element can be supported by the pair of support surfaces, and thereby the impact applied to the diamond element can be relieved and the cutting force increased.

Another aspect of the present invention is a drilling tool. This drilling tool includes a tool body, posts provided in plurality on the distal surface of this tool body, and a cutting tip attached to each of the posts. The cutting tip is any of the cutting tips described above. In addition, the drilling tool can comprise a tool body and a cutting element provided in plurality on the distal surface of the tool body, and the cutting element can be any of the cutting elements described above.

BRIEF DESCRIPTION OF THE DRAWINGS

FIG. 13 and FIG. 14 are graphs showing the fluctuation of Ni concentration in the case of Ni diffusion.

PREFERRED EMBODIMENTS OF THE PRESENT INVENTION

Below, embodiments of the present invention will be explained with reference to the figures. However, the present invention is not limited by the embodiments described below, and for example, the essential elements can be appropriately combined.

Figure 1:
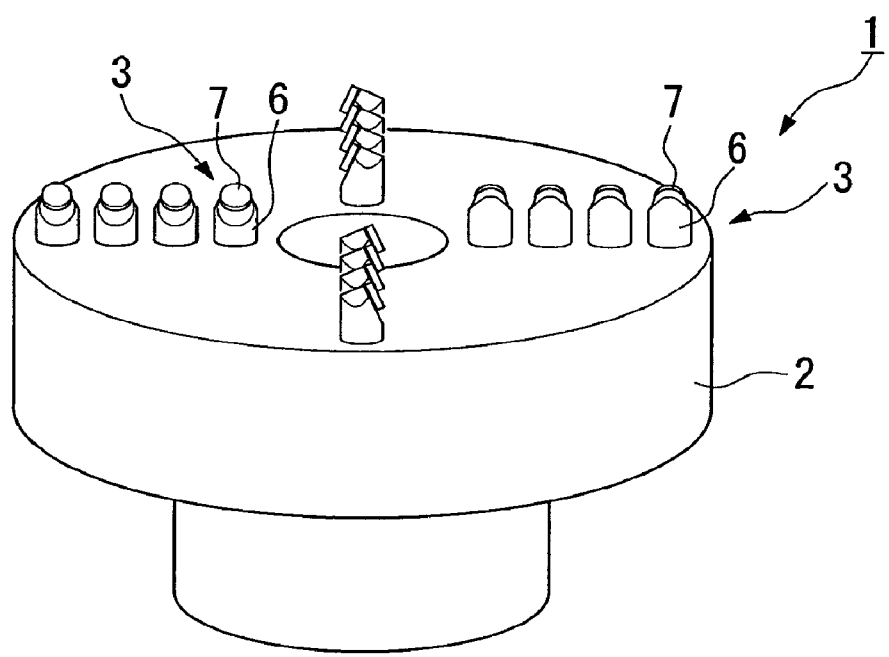
FIG. 1 is a perspective drawing showing an embodiment of the drilling tool of the present invention.

FIG. 1 shows an example of the drilling tool of the present invention. This drilling tool 1 includes a tool body 2 having a substantially disk shape and a plurality of cutting elements 3 attached to the distal surface of the tool body 2. The cutting elements 3 are attached by means such as brazing or shrinkage fitting to the tool body 2, and are disposed so as to have a predetermined arrangement that is rotationally symmetrical with respect to the center of the tool body 2. The cutting elements 3 in this example are disposed along a pair of intersecting perpendicular diameter lines with gaps provided therebetween. The tool body 2 is formed, for example, by an iron alloy as stipulated by JIS SCH 4 15.

Figure 2:
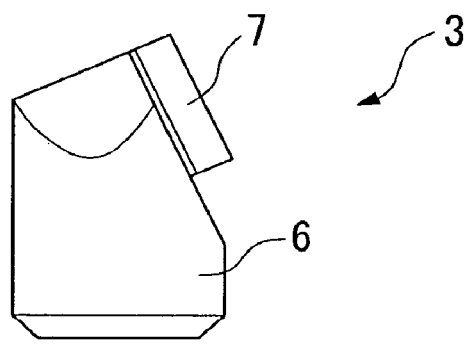
FIG. 2 is a side view of a cutting element that can be used in the drilling tool shown in FIG. 1.

As shown in FIG. 2, the cutting element 3 includes a cemented carbide post 6 made of a cemented carbide and having, for example, a cylindrical shape, and a cutting tip 7 attached by brazing or the like to the surface facing the drilling direction of the cemented carbide post 6. The material for the cemented carbide post 6 is not limited, and it can be formed by a general tungsten carbide cemented carbide or the like. The shapes of the cemented carbide post 6 and the cutting tip 7 are not limited to the above, and can be modified as necessary.

Figure 3:
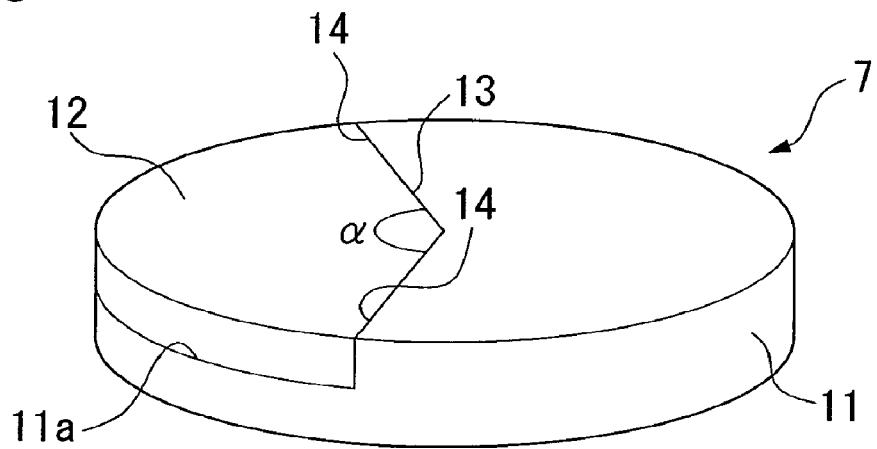
FIG. 3 is a perspective drawing of a cutting tip that can be used in the cutting element shown in FIG. 2.
Figure 4:
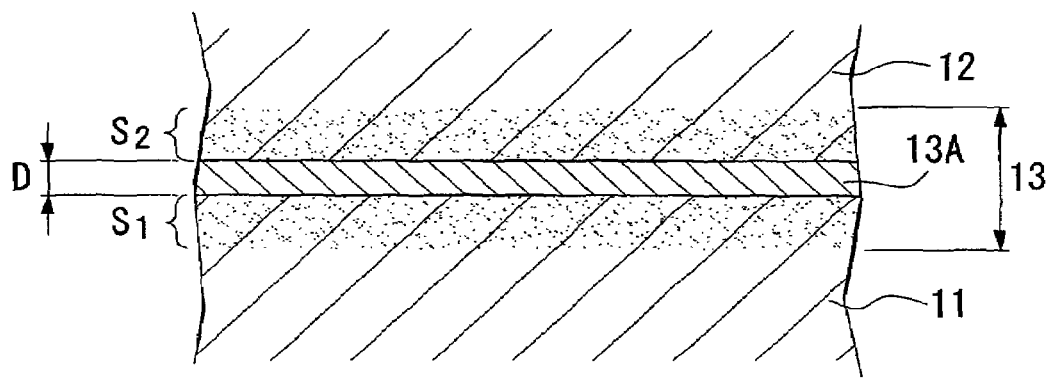
FIG. 4 is a cross-sectional exploded drawing showing the bonding layer of the cutting tip of the present invention.

As shown in FIG. 3, the cutting tip 7 includes a cutting base (cemented carbide element) 11 bonded to the cemented carbide post 6 and a diamond element 12 attached to this cutting base 11, and a bonding layer 13 is formed therebetween. The cutting base 11 and the diamond element 12 are strongly bonded by the bonding layer 13.

The cutting tip 7 of the present embodiment has a disk shape as a whole with a uniform thickness. The cutting base 11 is substantially disk shaped, and one surface thereof (the bottom surface in FIG. 3) is a brazing surface for brazing to the cemented carbide post 6. An installation site 11a is formed on the upper surface of the cutting tip 7 in FIG. 3 on the leading edge in the drilling direction.

The installation site 11a is a fan-shaped recess centered on the center of the cutting base 11, and has a uniform thickness. The thickness thereof, which is equivalent to the thickness of the diamond element 12, is not limited, but preferably is about 10 to 60% of the thickness of the cutting base 11, and more preferably, 20 to 40%.

The installation site 11a has a pair of V-shaped support surfaces 14 whose opening widens towards the leading edge, and these support surfaces 14 receive and stop the impact applied to the diamond element 12 during drilling. When the installation site 11a has a support surface 14 with this type of wedge shape, the impact applied to the diamond element 12 is widely diffused over the cutting base 11, and thereby the strength against the impact is increased. In this embodiment, the angle between the support surfaces 14 is not limited, but is preferably 45 to 108°, and more preferably 80 to 100°. The shape of the installation site 11a is not limited to the fan shape, and can be a simple semicircular shape or the like.

The diamond element 12 has a shape conforming to that of the installation site 11a, and is attached therein. Thereby, when the drilling tool 1 advances along the axial direction while being rotated around its axis, only the diamond element 12 comes into contact with the drilled material to drill the drilled material. Therefore, there is little wear on the cutting base 11.

The cutting base 11 is formed by a cemented carbide such as a tungsten carbide cemented carbide using Co as the binding agent. For example, the cutting base 11 can be formed by a cemented carbide that includes Co at 10% by mass as a binding agent with the remainder consisting of WC and unavoidable impurities. Because the cemented carbide has a high strength and a high toughness, the cutting base 11 acts as a shock absorbing body that absorbs the thermal shock and the mechanical impact applied to the cutting tip 7 during the drilling operation.

The diamond element 12 is provided at the region on the cutting tip 7 where wear occurs easily during the drilling operation. In the present embodiment, the ratio of the length of the arc of the diamond element 12 to the length of the semicircular arc on the leading edge of the drilling direction of the cutting tip 7 is preferably 25 to 70%. When the ratio is less than 25%, the cemented carbide contributes directly to the drilling. When the ratio exceeds 70%, the ratio of the shock absorbing portion becomes too small relatively, and the extremely high thermal and mechanical impact generated by the high-speed rotation operation cannot be sufficiently absorbed. Thus, the occurrence of minor chipping particularly at the wear area increases. This ratio is preferably 35 to 55%. However, this range is not limiting.

In the present embodiment, the diamond element 12 is preferably a high heat resistant sintered diamond including a binder phase of 0.1 to 15% by volume, where this binder phase is formed by one or two or more selected from the group consisting of carbonates of Mg, Ca, Sr, and Ba, oxides of Mg, Ca, Sr, and Ba, complex carbonates and complex oxide containing two or more thereof. Among these, in particular a high heat resistant sintered diamond using magnesium carbonate as a binding agent is preferable because the sintering hardness is especially high and the wear resistance is advantageous. In addition, in the case of using magnesium carbonate as a binding agent, the diffusion of metal elements into the high heat resistant diamond is favorable, and thus has the advantage that the time required for the bonding processing with the cutting base 11 becomes short.

The diamond element 12 can be formed by standard sintered diamond using Co as the binding agent or a complex of a standard sintered diamond and a high heat resistant diamond.

The bonding layer 13 in the present embodiment includes a second diffusion layer S2 in which one or two or more metals selected from a group consisting of Fe, Ni, Co, Ti, Zr, W, V, Nb, Ta, Cr, Mo, and Hf diffuses into the cemented carbide of the cutting base 11, a first diffusion layer S1 in which metal diffuses into the diamond of the diamond element 12, and a metal layer 13A that remains including metal that has not diffused.

In the case of metals having particularly good diffusion properties (Fe, Ni, Co), all of the metal may diffuse completely into the cutting base 11 and/or the diamond element 12, and none of the metal layer 13A may remain. When the diffusion of the metals is favorable for only one of the cemented carbide or the diamond, there will also be the case in which only one of the first diffusion layer S1 or the second diffusion layer S2 is substantially formed (it does not matter whether or not the metal layer 13A is formed). Furthermore, any or all of the border between the cutting base 11 and the second diffusion layer S2, the border between the second diffusion layer S2 and the metal layer 13A, the border between the metal layer 13A and the first diffusion layer S1, and the border between the first diffusion layer S1 and the diamond element 12 can be indistinct. The 30 present invention includes these types of cases. The range of formation of the first diffusion layer S1 and the second diffusion layer S2 can be investigated by carrying out line analysis using EPMA (Electron Probe Microanalyser) as described below, or observation of the organization using a microscope.

Figure 7:
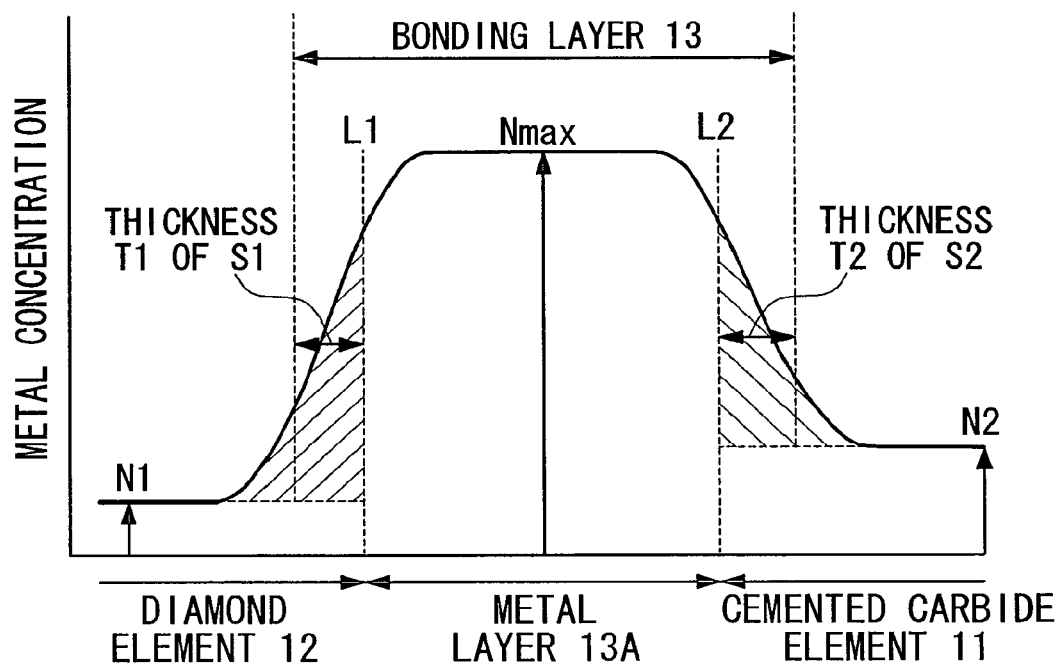
FIG. 7 and FIG. 8 are graphs showing an example of the metal concentration in a cross-section of the bonding layer.
Figure 8:
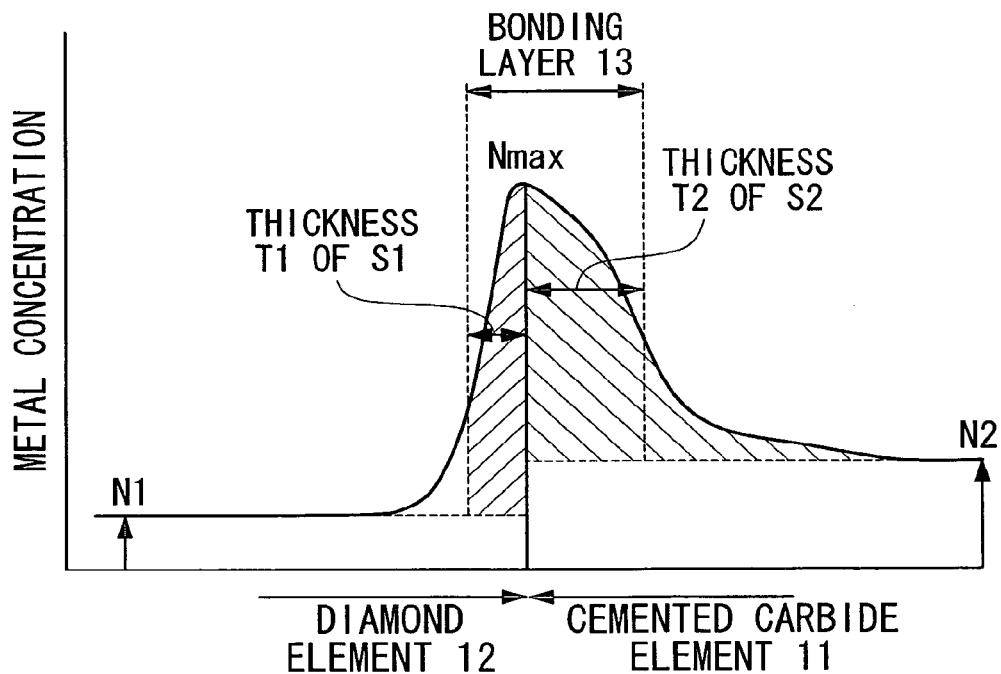

FIG. 7 and FIG. 8 are graphs showing the concentration of the diffused metal in the bonding layer 13 and the area adjacent thereto. This type of graph is obtained by carrying out line analysis of the cross-section of the bonding layer in the transverse direction using EPMA in the bonding layer 13 and the area adjacent thereto. FIG. 7 is a graph of the case in which the metal layer 13A remains, and FIG. 8 is a graph of the case in which the metal layer 13A does not remain.

In either case, the maximum value Nmax of the content of metal that has diffused into the bonding layer 13 is 20 times or greater than the average value N2 of the content in the region of the cutting base 11 element not influenced by the diffusion, and 100 times or greater than the average value N1 of the content in the region of the diamond element 12 not influenced by the diffusion. In this case, the bonding strength is increased due to the first diffusion layer S1 and the second diffusion layer S2, and at the same time the impact relief effect attributable to the bonding layer 13 becomes advantageous.

Next, the fabrication method of the cutting tip 7 will be explained.

First, the cutting base 11 and the diamond element 12 are fabricated in a predetermined shape. The cutting base 11 is fabricated identically to a standard cemented carbide product. For example, a disk shaped cemented carbide tip is formed by molding and sintering a base material powder for the cemented carbide, and an installation site 11a is formed by applying a cutting operation to this cemented carbide tip. Alternatively, a base material powder for a cemented carbide can be directly molded and sintered into a disk shape having an installation site 11a.

An example of a method for producing the diamond element 12 will now be explained. For example, in the case of using a diamond powder having an average particle diameter of 10 μm and a purity of 99.9% or greater and a $MgCO_3$ powder having an average particle diameter of 10 μm and a purity of 95% or greater as the base material powders, the $MgCO_3$ powder is made into a green compact having the desired shape by press molding the $MgCO_3$ under a pressure of 100 MPa. Next, this green compact is charged into a capsule made of Ta and the diamond powder is placed on the green compact to fill the inside of the capsule. In this state, ultrahigh pressure sintering is carried out by placing the capsule into an ultrahigh pressure belt sintering apparatus (an ultrahigh pressure sintering apparatus standardly used in sintered diamond fabrication), and a block of sintered diamond including $MgCO_3$ at 5% by volume is obtained. This ultrahigh pressure sintering can be carried out, for example, by heating at a temperature of 2250° C. under a pressure of 7.7 GPa maintained for 30 minutes. However, the present invention is not limited to these conditions.

After applying rough processing to the block of this sintered diamond by grinding using a diamond grindstone, a diamond piece having the desired shape is cut out by laser processing, and thereby the diamond element 12 is obtained.

Next, a metal material is interposed between the cutting base 11 and the diamond element 12 obtained as described above, where this metal material includes at 70% by mass or greater one or two or more metals selected from a group consisting of Ti, Zr, W, V, Nb, Ta, Cr, Mo, or Hf, and the diamond element 12 is embedded in the installation site 11*a* of the cutting base 11. A metal foil (for example, having a thickness of 0.02 to 0.1 mm) is preferable as a metal material, but this is not limiting, and a metal powder, a fiber metal, or a compound of metal can also be used.

The cutting base 11, the metal foil, and the diamond element 12 that have been temporarily assembled in this manner are set in an ultrahigh pressure sintering apparatus such as an ultrahigh pressure belt sintering apparatus, heat processing is carried out at an ultrahigh temperature and pressure, these elements are integrated by bonding, and the cutting tip 7 is obtained. In this embodiment, the elements are heated to a temperature of 1500° C. under a pressure of 5.5 GPa maintained for 30 minutes. However, these ranges are not limiting.

Due to this heat processing, the components of the metal foil diffuse into the cutting base 11 and the diamond element 12. Adjacent to the border between the cutting base 11 and the metal foil, the second diffusion layer S1 wherein the components that form the metal foil diffuse into the cemented carbide, is formed. Adjacent to the border between the diamond element 12 and the metal foil, the first diffusion layer S1 wherein 25 the components that form the metal foil diffuse into the diamond, is formed.

The thermal expansion rates of the cutting base 11 and the diamond element 12 are different, but the metal layer 13 is formed therebetween, and this metal layer 13 acts as a stress relief material. Thereby, when returning to normal temperature and pressure after the heat processing, the stress that accumulates between the cutting base 11 and the diamond element 12 is absorbed by the metal layer 13. Thereby, stress concentrates in the diamond element 12 with difficulty, cracking and the like between the cutting base 11 and the diamond element 12 occurs with difficulty, and separation between the cutting base 11 and the diamond element 12 occurs with difficulty. Next, the characteristics of each metal will be explained separately.

Fe and Ni

Fe and Ni diffuse into the diamond element 12 and the cutting base 11 favorably. Thus, in the case of using Fe and/or Ni as the diffusing metals, a relatively thick first diffusion layer S1 and second diffusion layer S2 are formed inside the diamond element 12 and the cutting base 11. Due to the presence of the thick diffusion layers S1 and S2, stress applied to the diamond element 12 during drilling can be easily diffused, and cracking and the like between the diamond element 12 and the cutting base 11 occurs with difficulty. In the case of using Fe and/or Ni as the diffusing metals, the metal layer 13A becomes thin or disappears, and thus the concentration distribution of the Fe and/or Ni adjacent to the bonding layer 13 tends towards the distribution shown in FIG. 8. In particular, in the case of Ni, the diffusion into the cutting base 11 is remarkable. Ni may diffuse across the entire area of the cutting base 11, and in this case, the effect of diffusing the stress applied to the diamond element 12 during drilling is improved.

When the diamond element 12 and the cutting base 11 are bonded using Fe and/or Ni as the metal material, the diamond element 12 and the cutting base 11 are temporarily assembled after interposing a metal material therebetween. Preferably either a 0.02 to 0.3 mm Ni foil, Fe foil, or Ni—Fe alloy foil can be used as the metal material. When using a Ni—Fe alloy foil, the diffusion becomes advantageous because it has a lower melting point than the pure metals.

During the bonding, heating is carried out under conditions A (K) and B (GPa) that satisfy the following two equations simultaneously, and the diffusion layers S1 and S2 are formed by the Fe and/or Ni diffusing into the diamond element 12 and the cuffing base 11.

$$A > 1175$$

$$B > 0.0027 \times A + 0.81$$

The above range is the area in which the diamond is in the thermodynamically stable region represented by the Barman-Simon equation and the temperature at which the metal elements can diffuse. This characteristic is identical for the other metal elements described below.

Figure 9:
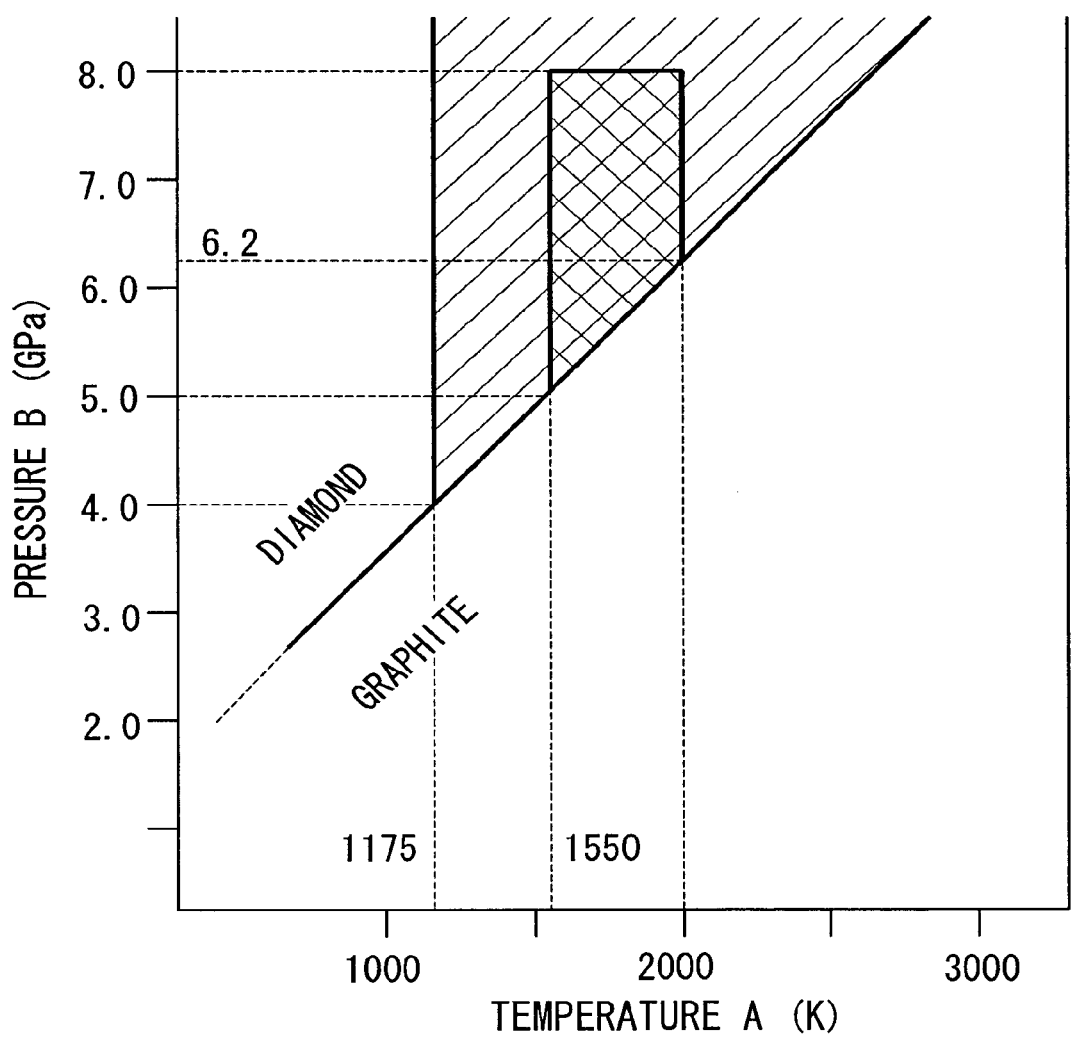
FIG. 9 is a graph showing the thermal bonding conditions in the method of the present invention.

The range shown by the diagonal line in FIG. 9 illustrates the ranges of A and B described above. The range shown by the intersecting lines in FIG. 9 is a more preferable region, and this region is encompassed by the following coordinates:

(1550 K, 5.0 GPa)
(1550 K, 8.0 GPa)
(2000 K, 8.0 GPa)
(2000 K, 6.2 GPa)

The thickness of the first diffusion layer S1 is preferably 0 to 0.2 mm, and more preferably 0.01 to 0.05 mm. The thickness of the second diffusion layer S2 is preferably 0 to 5 mm, and more preferably 0.1 to 3 mm. When the thicknesses are within this range, the bonding strength between the diamond element 12 and the cutting base 11 is strong and the impact resistance can be made high.

Moreover, in this specification, the thickness of the diffusion layers S1 and S2 is defined as follows. Along the cross-section of the bonding layer 13, the concentration of the metals is measured by EPMA or by Auger Electron Microscopy. In the case that the diffusion layer is thin, Auger Electron Microscopy is suitable. FIG. 7 and FIG. 8 are graphs showing the concentration of metals starting from the diamond element 12, through the bonding layer 13, and ending in the cutting base 11.

As shown in FIG. 7, in the case that the metal layer 13A remains in the bonding layer 13, the area of the portions (the diagonal portion) is found. The area is obtained by respectively subtracting the metal concentration N1 in the diamond element 12 not influenced by diffusion and the metal concentration N2 in the cutting base 11 not influenced by diffusion from the regions outside the respective borders L1 and L2 between the metal layer 13 and the diamond element 12 and the cutting base 11. The area from the borders L1 and L2 to the point encompassing 80% of this surface area serves as the thickness of T1 and T2 of the diffusion layers S1 and S2.

In contrast, as shown in FIG. 8, in the case that a metal layer 13A does not remain in the bonding layer 13, the area of the portions (the diagonal portion) is found. The area is obtained by subtracting the metal concentration N1 in the diamond element 12 not influenced by diffusion and the metal concentration N2 in the cutting base 11 not influenced by diffusion from both sides from the point of the maximum value Nmax of the metal concentration. The area from the point of the maximum value Nmax to the point encompassing 80% of this surface area serves as the thickness of T1 and T2 of the diffusion layers S1 and S2.

The metal material is interposed between the diamond element 12 and the cutting base 11, and these elements are temporarily attached. In the case that these elements are heated under an ultrahigh pressure of 5 to 6 GPa at a temperature of 1400 to 1550° C. by an ultrahigh pressure heating apparatus, it can be confirmed that the diffusion layers of the Ni and/or Fe are formed to a thickness of 0.01 to 0.05 mm on the diamond element 12 side and to a depth of 0.1 to 3 mm on the cutting base 11 side.

Ni and Graphite and/or Diamond

When using Ni as the diffusion element, the diffusion of Ni into diamond is favorable, and thus there are cases in which the Ni diffuses into the diamond element causing the volume of the diamond element to decease. In this case, carbon is introduced into the Ni object layers, and thereby the diffusion of the Ni into the diamond element can be suppressed.

In this case, a first layer and a third layer that include Ni at 70% by mass or greater is used as a metal material, and the second layer interposed between the first layer and the third layer. The second layer serves as a layer that includes carbon at 70% by mass or greater, and concretely, a graphite and/or diamond plate or powder are used.

The second layer is preferably set such that the metal material includes Ni at 55 to 80% by mass of the whole, and includes the carbon at a total of 20 to 45% by mass. More preferably, the metal material includes Ni at 60 to 70% by mass of the whole, and includes the carbon at a total of 30 to 40% by mass.

In the process in which a cemented carbide element and a diamond element are bonded, heating is carried out under conditions A (K) and B (GPa) that satisfy the following two equations simultaneously, and the diffusion layer is formed by the Ni diffusing into the diamond of the diamond element.

$$A > 1175$$

$$B > 0.0027 \times A + 0.81$$

More preferably, the range is encompassed by the following coordinates:
(1550 K, 5.0 GPa)
(1550 K, 8.0 GPa)
(2000 K, 8.0 GPa)
(2000 K, 6.2 GPa)

The thickness of the first diffusion layer S1, the thickness of the second diffusion layer S2, and the thickness of the metal layer 13A are identical to the case of Ni diffusion described above.

In this manner, when using a metal material having a second layer, which has graphite and/or diamond as the main constituent, interposed between the first layer and the third layer, which have Ni as the main constituent, carbon dissolves into the Ni during diffusion and bonding, and thereby diffusion of the solid solution into the diamond element is suppressed. Thus, because the diffusion of Ni into the diamond element is suitably suppressed, a high diffusion bonding strength can be obtained while the reduction in volume of the diamond element due to excess diffusion of Ni can be suppressed.

Co

Like Fe and Ni, Co also diffuses into the diamond element 12 and the cutting base 11 favorably. Thus, when using Co as the diffusing metal, a comparatively thick first diffusion layer S1 and second diffusion layer S2 are formed in the diamond element 12 and the cutting base 11. Due to the presence of the thick diffusion layers S1 and S2, stress applied to the diamond element 12 during drilling can be easily diffused, and cracking and the like between the diamond element 12 and the cutting base 11 occur with difficulty. In addition, Co has the advantage that the depletion into the diamond is more favorable than Fe and Ni.

However, when using Co, the first diffusion layer S1 and the second diffusion layer S2 are rather rigid, and thus preferably the bonding conditions are adjusted such that none of the Co diffuses, and the metal layer 13A including Co substantially remains.

When the diamond element 12 and the cutting base 11 are bonded using Co as a metal material, the diamond element 12 and the cutting base 11 described above are temporarily attached with the metal material interposed therebetween. A 0.02 to 0.3 mm Co foil is preferably used as the metal material.

While bonding, heating is carried out under conditions A (K) and B (GPa) that satisfy the following two equations simultaneously, and the diffusion layers S1 and S2 are formed by the Co diffusing into the diamond element 12 and the cutting base 11.

$$A > 1175$$

$$B > 0.0027 \times A + 0.81$$

More preferably, the range is encompassed by the following coordinates:
(1550 K, 5.0 GPa)
(1550 K, 8.0 GPa)
(2000 K, 8.0 GPa)
(2000 K, 6.2 GPa)

The thickness of the first diffusion layer S1 is preferably 0.005 to 0.2 mm, and more preferably 0.01 to 0.05 mm. The thickness of the second diffusion layer S2 is preferably 0.01 to 5 mm, and more preferably 0.02 to 3 mm. The thickness of the metal layer 13A is preferably 0.01 to 0.2 mm, and more preferably 0.05 to 0.1 mm. When the thicknesses are within the these ranges, the bonding strength between the diamond element 12 and cutting base 11 is high, and the impact resistance can be made high.

Ti, Zr, W, V, Nb, Ta, Cr, Mo, or Hf

The diffusion of Ti, Zr, W, V, Nb, Ta, Cr, Mo, or Hf into the diamond element 12 and the cutting base 11 is low in comparison to Fe, Ni, and Co. Thus, when using one or two or more metals selected from a group consisting of Ti, Zr, W, V, Nb, Ta, Cr, Mo, and Hf as the diffusing metal, only a comparatively thin diffusion layer are formed. Nevertheless, they have properties that can guarantee that the bonding strength will be high. In addition, because the metal layer 13A remains in a comparatively thin state, the concentration distribution becomes that shown in FIG. 7. Therefore, the impact relieving action due to the metal layer 13A is high. In addition, because hard carbide forms with the diamond, the bonding strength is high due to this factor as well.

Ti, Zr, and W are all metals having high melting points (the melting point is 1725° C. for Ti, 1857° C. for Zr, and 3382° C. for W), and the melting points for alloys of the 25 same are also high. When using these three metals, a tough carbide (Tic, ZrC, and WC) are formed particularly in the first diffusion layer S1 due to the combining of the components of the metal foil and the components of the diamond element 12. Thus, the bonding strength between the diamond element 12 and the metal layer 13A can be made remarkably high.

V, Nb, and Ta are also metals having high melting points (the melting point is 1700° C. for V, 2467° C. for Nb, and 2850° C. for Ta), and the melting points for alloys thereof are also high. Among high melting point metals, V, Nb, and Ta are metals that have a high ductility, and the alloys thereof also have a high ductility. Therefore, the impact applied to the bonding portion is absorbed by the metal layer 13A, and failure due to fatigue in the bonding portion occurs with difficulty.

Mo, Cr, and Hf are all metals having extremely high melting points (the melting point is 2622° C. for Mo, 1905° C. for Cr, and 2207° C. for Hf), and they have superior heat resistance. The melting points for alloys thereof are also extremely high, and they also have superior heat resistance. Therefore, a high heat resistance can be obtained when using Mo, Cr, and Hf.

When bonding the diamond element 12 and the cutting base 11 using one or two or more metals selected from a group consisting of Ti, Zr, W, V, Nb, Ta, Cr, Mo, or Hf, the diamond element 12 and the cutting base 11 described above are temporarily attached after a metal layer is interposed therebetween. Preferably either a 0.02 to 0.3 mm pure metal foil or alloy foil is used as the metal material. Because the melting point is lower when using an alloy foil than when using a pure metal, the diffusion is advantageous. By overlying metal foils including different metal species, an effect is obtained that is similar to mixing powders of different metal species. This method can be used for any of the metals.

While bonding, heating is carried out under conditions A (K) and B (GPa) that satisfy the following two equations simultaneously, and the diffusion layers S1 and S2 are formed by the Ti, Zr, W, V, Nb, Ta, Cr, Mo, or Hf diffusing into the diamond element 12 and the cutting base 11.

$$A > 1175$$

$$B > 0.0027 \times A + 0.81$$

More preferably, the range is encompassed by the following coordinates:

(1550 K, 5.0 GPa)
(1550 K, 8.0 GPa)
(2000 K, 8.0 GPa)
(2000 K, 6.2 GPa)

The thickness of the first diffusion layer S1 is preferably 0.002 to 0.05 mm, and more preferably 0.005 to 0.01 mm. The thickness of the second diffusion layer S2 is 0.005 to 0.5 mm, and more preferably 0.01 to 0.05 mm. The thickness of the metal layer 13A is preferably 0.01 to 0.2 mm, and more preferably 0.02 to 0.08 mm. When the thickness is within the these ranges, the bonding strength between the diamond element 12 and cutting base 11 is high, and the impact resistance can be made high.

Explanation of the Drilling Tool

The cutting tip 7 obtained as described above serves as the cutting element 3 brazed to the cemented carbide post 6. In addition, the drilling tool 1 is obtained by mounting the cutting element 3 on the tool body 2.

In this drilling tool 1, the cutting base 11 and the diamond element 12 are firmly bonded in the cutting tip 7. Thereby, it becomes possible to drill under the heavy load conditions of, for example, high-speed drilling. The melting point of the metal or alloy that form the metal layer 13 is sufficiently high in comparison to the conventional brazing filler metal, and the heat resistance of the bonded portion between the cutting base 11 and the diamond element 12 is increased in comparison to the conventional technology. Thus it is possible to carry out drilling at a high-speed, which is impossible in a conventional drilling tool due to the heat resistance problem of the brazing filler metal used therein.

When carrying out high-speed drilling, extremely high thermal and mechanical impact is applied to the cutting tip 7. The diamond element 12 itself, which is used as the cutting tip 7, is remarkably hard, but contrariwise, because it is brittle, chipping occurs easily when a strong impact is applied. In the diamond element 12, the advancement of wear is significantly promoted due to the occurrence of chipping, and as a result, the service life is comparatively short.

As a result of the investigations of the inventors, it has been understood that due to the relationship of the mounting position of the cutting tip 3 in the drilling tool 1, in the cutting tip 7 that forms the cutting element 3, the wear due to drilling does not advance over the entire surface of the cutting tip, but occurs locally at particular locations on the leading face of the cutting tip. The wear on the remaining portion is simply minor wear that is dependent on the local wear. In addition, it has been understood that the size of the area in which the local wear occurs is equal to or less than 25% of the surface area of the leading face of the cutting tip.

In the present embodiment, a diamond element 12 having superior wear resistance is provided by being positioned on the cutting tip 7 in the region where the wear occurs locally, while other portions are formed by a cemented carbide cutting base 11 that is shock absorbent. Thereby, local wear of the cutting tip 7 occurs with difficulty, minor chipping in the diamond element 12 due to impacts occurs with difficulty because thermal and mechanical impacts applied to the cutting tip 7 during drilling are absorbed by the cutting base 11, and thus the service life of the cutting tip is improved.

When the ratio of the length of the diamond element 12 to the arc length of the cutting tip is less than 25%, the cemented carbide cutting base 11 contributes directly to drilling, and wear of the cutting base 11 is promoted. In contrast, when this ratio exceeds 70%, the relative ratio of the cutting base 11 that acts as a shock absorbing portion becomes too small, the extremely high thermal and mechanical impact that occurs during high-speed rotation operation is not sufficiently absorbed, and the occurrence of chipping in the diamond element 12 in particular increases rapidly. Thus, the ratio of the diamond element 12 to the length of the arc of the leading edge of the cutting tip 7 is preferably 25 to 70%, and more preferably 35 to 55%.

In the embodiment described above, the cutting tip 7 was formed by a cutting base 11 having a fan-shaped installation site 11a and a fan-shaped diamond element 12 including heat resistant sintered diamond, but this is not limiting. The elements that form the cutting tip 7 can have other arbitrary shapes.

Figure 5A:
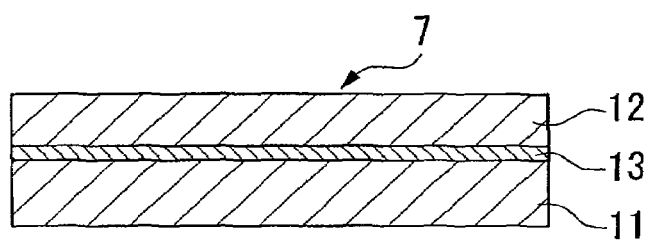
FIGS. 5A to 5C are longitudinal cross-sections showing another embodiment of the cutting tip.

For example, in the cutting tip 7 in FIG. 5A, the disk shaped cutting base 11 and the disk shaped diamond element 12 are bound by a bonding layer 13.

Figure 5B:
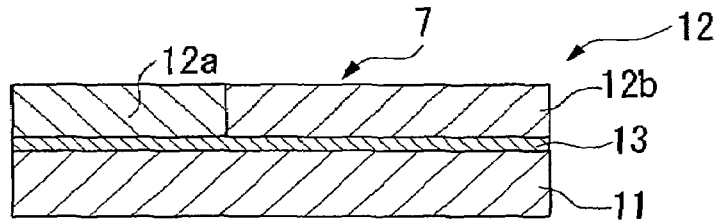

In the cutting tip 7 in FIG. 5B, a part thereof is a high heat resistant diamond part 12a including high heat resistant diamond, and the remaining part is a sintered diamond part 12b including standard sintered diamond.

Figure 5C:
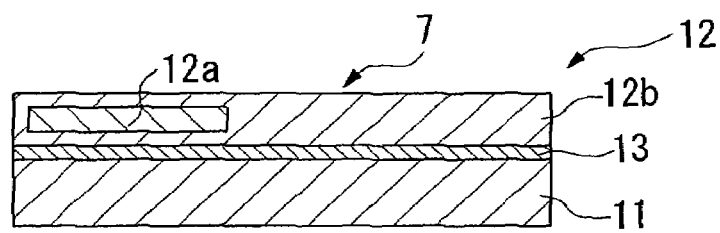

In the cutting tip 7 in FIG. 5C, the high heat resistant diamond part 12a is embedded in the sintered diamond part 12b.

Figure 10:
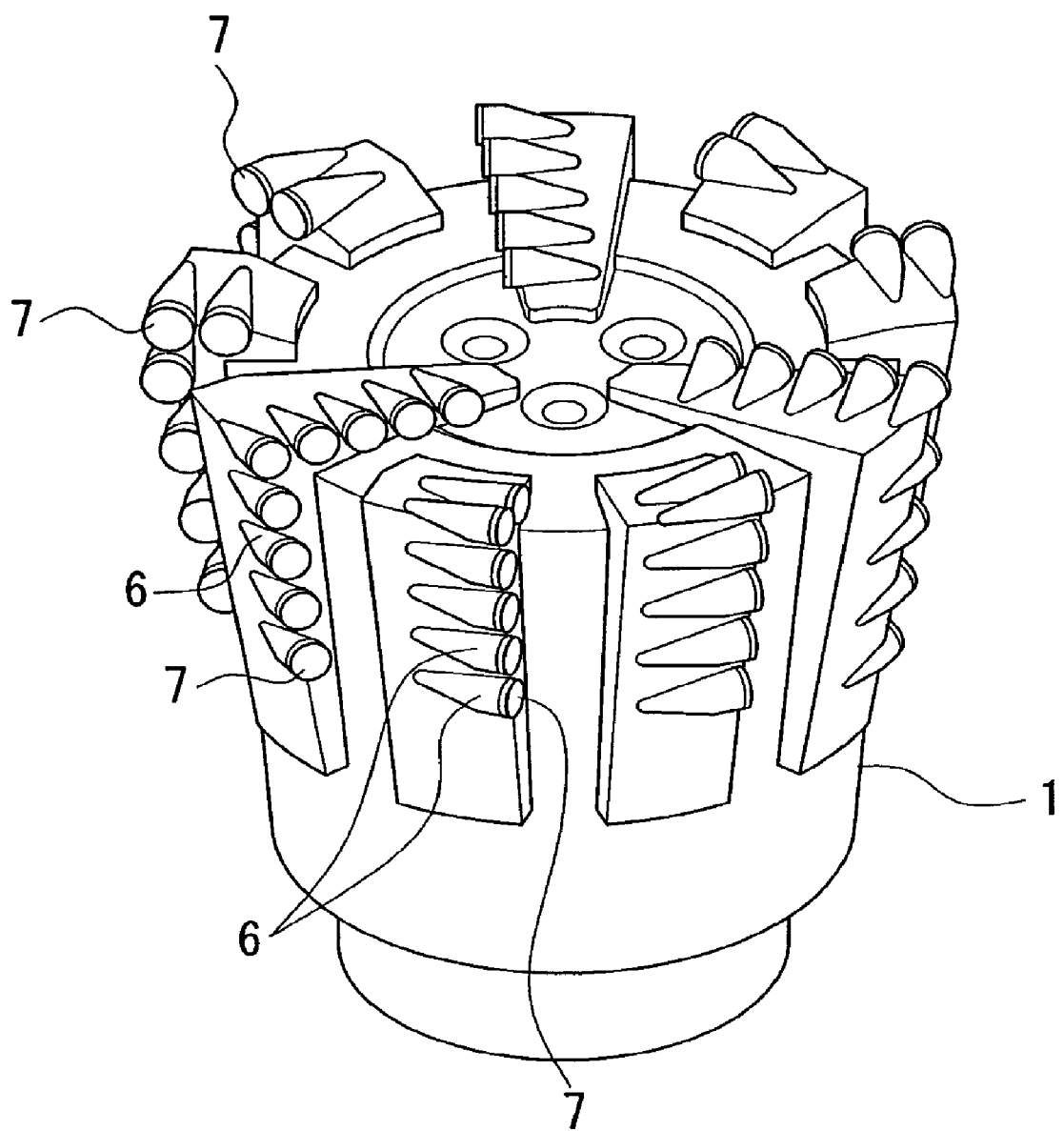
FIG. 10 is a perspective drawing showing another example of the shape of the drilling tool of the present invention.

The shape of the drilling tool 1 is not limited to the shape shown in FIG. 1. For example, as shown in FIG. 10, a structure is possible wherein the cutting tip 7 is attached so as to project from the peripheral surface of the tool body 2.

Figure 6:
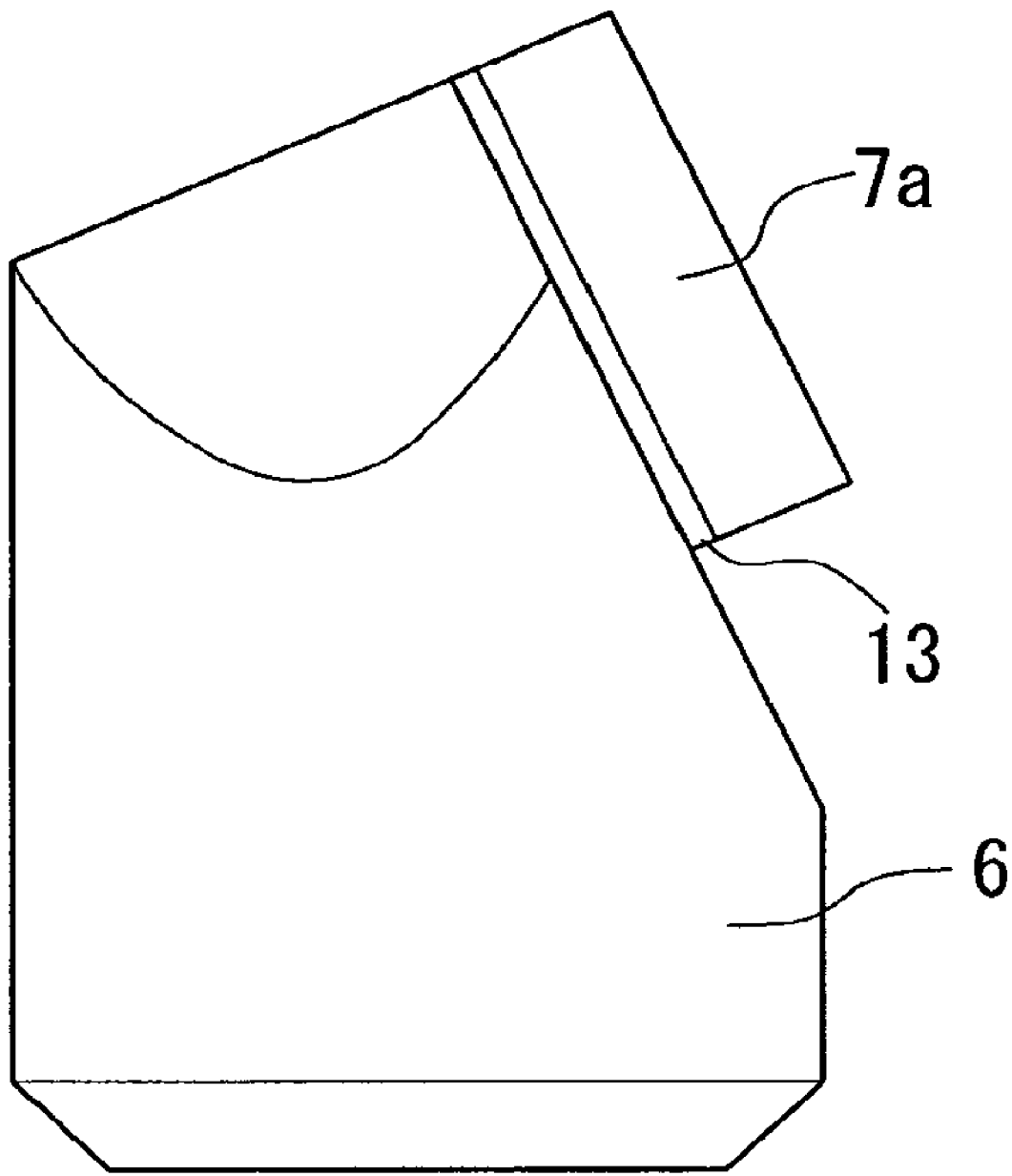
FIG. 6 is a side view showing another embodiment of the cutting element of the present invention.

In the present embodiment, the bonding method and bonding structure of the cemented carbide element and the diamond element according to the present invention are shown as examples applied to the cutting tip 7 of the drilling tool 1, but this is not limiting. For example, as shown in FIG. 6, when used as a cutting tip, the cutting tip 7a that is entirely formed by a standard sintered diamond or a high heat resistant diamond, the present invention can be applied to the bonding between a cemented carbide post 6 and a cutting tip 7a in a cutting element 3.

In addition, the scope of application of the bonding method and the bonding structure between the cemented carbide element and the diamond element according to the present invention is not limited only to the above examples. Any arbitrary method or structure can be applied if the cemented carbide element and the diamond element can be bonded.

EXAMPLES

Experimental Example for Ni Diffusion

As a base material powder, a diamond powder having an average particle diameter of 10 μm and a purity of 99.9% or greater, and as a binding agent, a $MgCO_3$ powder having an average particle diameter of 10 μm and a purity of 95% or greater were prepared.

The $MgCO_3$ powder was made into a green compact having predetermined dimensions by press molding under a pressure of 100 MPa. Next, this green compact was charged into a capsule made of Ta, and the diamond powder was placed on the green compact to fill the capsule. The capsule was placed into a standard ultrahigh pressure belt sintering apparatus. A pressure of 7.7 GPa was applied to the capsule, a temperature of 2250° C. was maintained for 30 minutes, and ultrahigh pressure sintering was carried out to form a plurality of circular sintered diamond elements.

This diamond element had a diameter of 11 mm and a thickness of 1.5 mm, and includes $MgCO_3$ at 4.0% by volume as a binding agent. The upper and lower surfaces of the diamond element were ground by a #200 diamond grindstone to form a circular sintered diamond chip having a diameter of 11 mm and a thickness of 1.25 mm. From the diamond chip, fan-shaped diamond tips having a vertex of 90° were cut out using a laser, and a 0.5 mm chamfering was applied to each of the corners.

At the same time, a circular cemented carbide tip having a diameter of 12.5 mm and a thickness of 2.25 mm and a circular cemented carbide tip having a diameter of 12.5 mm and a thickness of 1.25 mm were prepared. These tips were formed by a cemented carbide including Co at 10% by mass as the binding agent with the remainder consisting of WC and unavoidable impurities. A fan-shaped recess having a shape conforming to the fan-shaped sintered diamond tip described above was formed in the circular cemented carbide tip having a thickness of 1.25 mm.

A fan-shaped diamond tip was inserted into the fan-shaped recess of the 1.25 mm thick cemented carbide tip after interposing a Ni foil, an Fe foil, or both a Ni foil and Fe foil having a thickness of 0.1 mm therebetween. This was placed at the center between circular cemented carbide tips having a thickness of 2.25 mm that were overlaid on both sides. Between the three layers of the cemented carbide tips, a metal foil like those described above was interposed. In this state, it was charged set into a standard ultrahigh temperature and pressure belt sintering apparatus to be integrally bonded under a pressure of 5.5 GPa at a temperature of 1500° C. maintained for 30 minutes.

In order to expose the fan-shaped sintered diamond tip, the portion of the superhard part covering it was removed by using a #200 diamond grindstone, then grinding processing was applied over the whole, and an experimental example 1 having a diameter of 8 mm and a thickness of 3.5 mm was produced.

Figure 11:
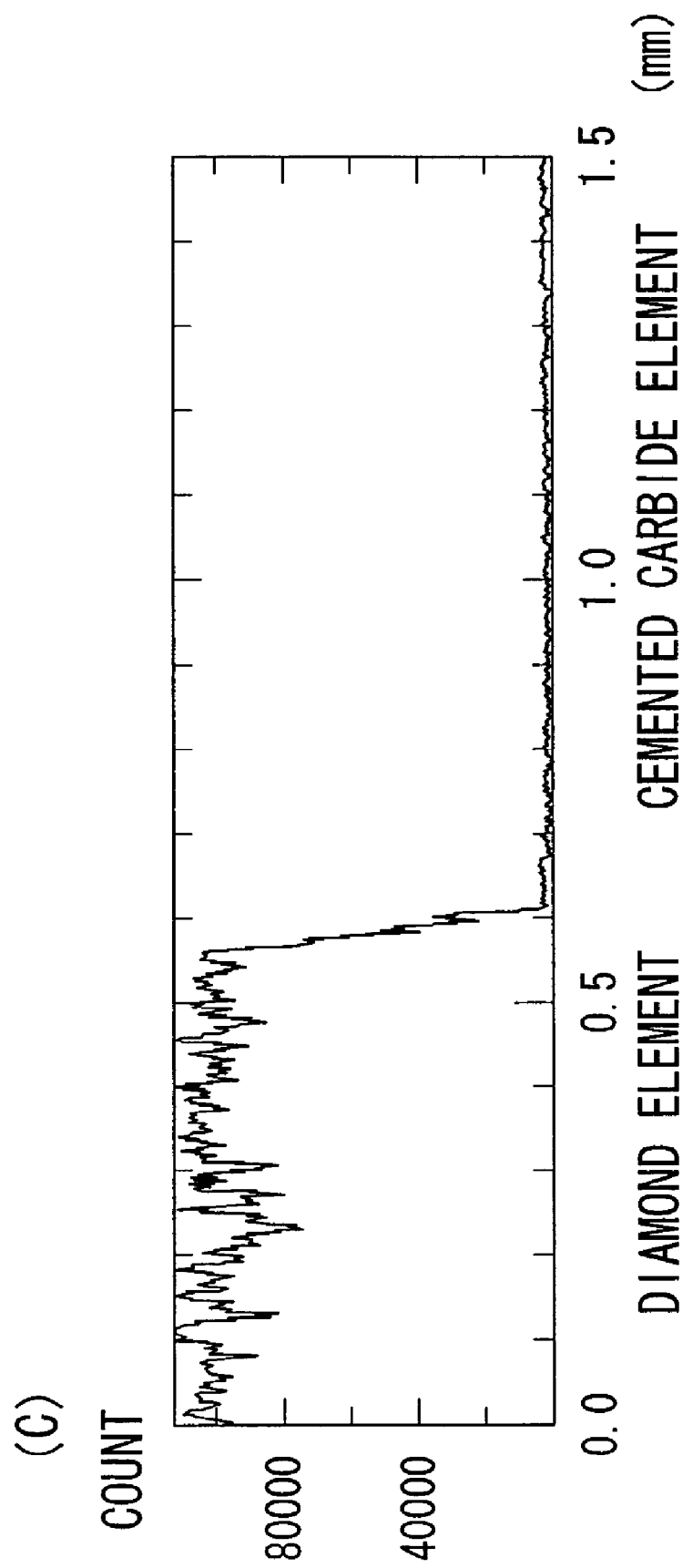
FIG. 11 is a graph showing the fluctuation of the carbon concentration in the case of Ni diffusion.
Figure 12:
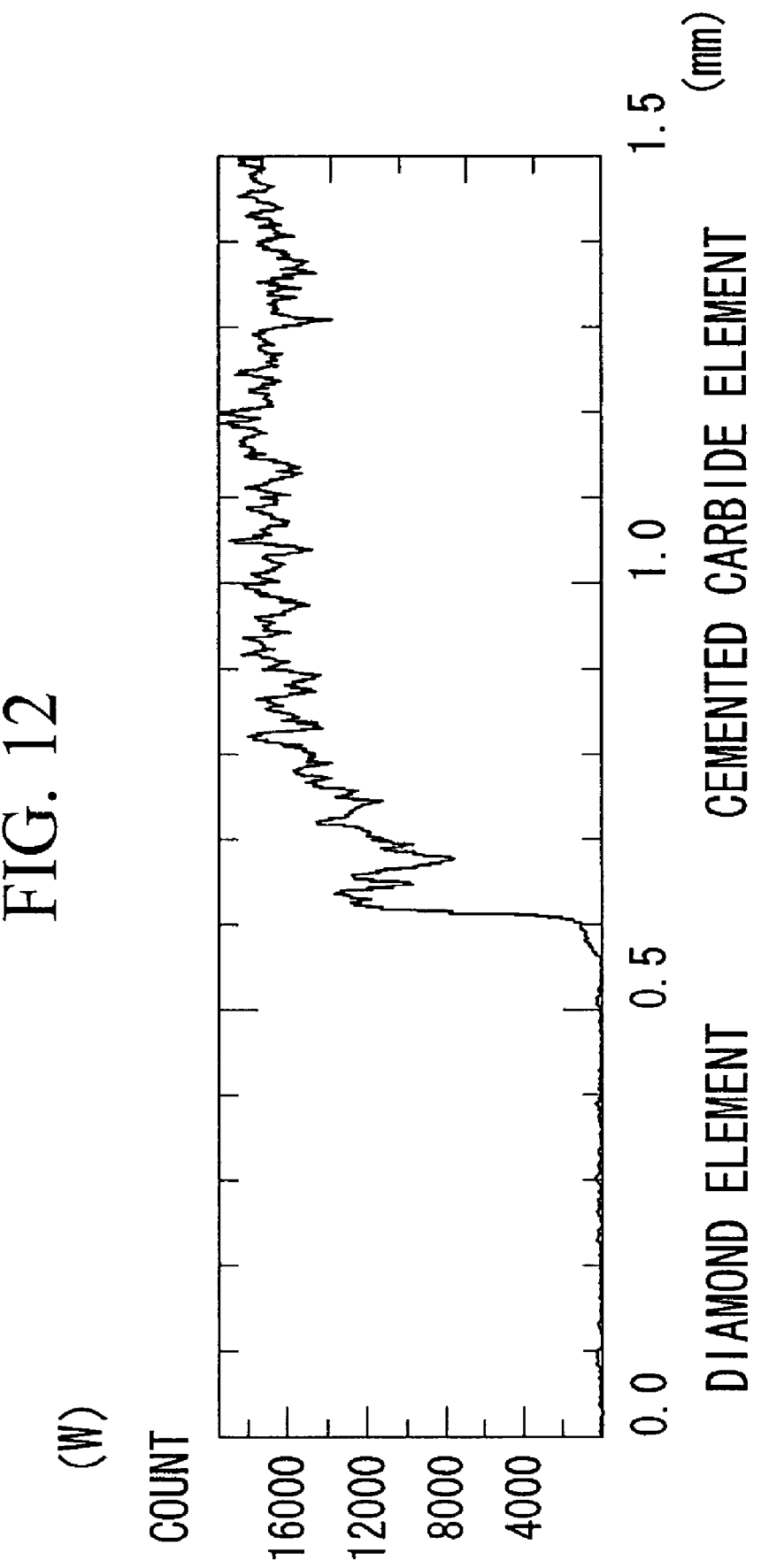
FIG. 12 is a graph showing the fluctuation in tungsten concentration in the case of Ni diffusion.
Figure 13:
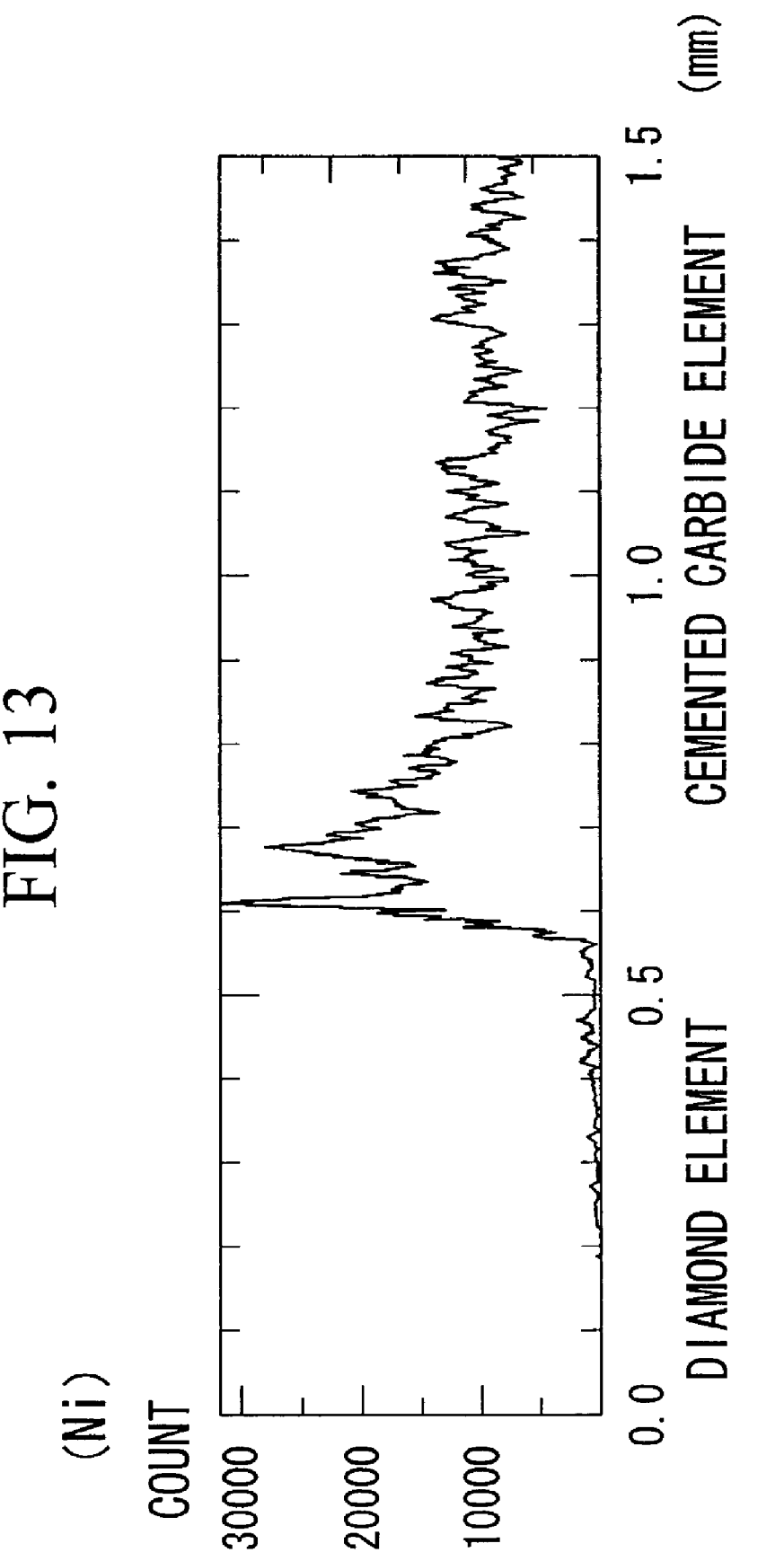

The bonding interfaces of the experimental example were examined using EPMA, and the diffusion layers were measured to a depth of 0.01 to 0.05 mm from the bonding interface of the diamond element and to a depth of 0.1 to 3.0 mm from the bonding interface of the cemented carbide element. FIG. 11 is a graph sowing the fluctuation in the carbon concentration adjacent to the bonding layer for Ni diffusion. FIG. 12 is a graph showing the fluctuation in the tungsten concentration adjacent to the bonding layer. FIG. 13 and FIG. 14 are graphs showing the fluctuation in the Ni concentration adjacent to the bonding layer. As shown in FIG. 14, the diffused Ni was distributed through the surface layer portion of the cemented carbide element. The peak that occurs at the 2.9 mm position in FIG. 14 is not related to diffusion.

Next, a WC powder having an average particle diameter of 1.5 μm, a $Cr_3C_2$ powder having an average particle diameter of 2.3 μm, a ZrC powder having an average particle diameter of 1.3 μm, and a Co powder having an average particle diameter of 3.4 μm were prepared as base material powders. These base material powders were mixed in % by mass at ratios of Co at 9%, $Cr_3C_2$ at 0.4%, ZrC at 0.2%, and the remainder WC, and then they were wet-mixed in a bowl mill for 72 hours. After drying, this mixture was press molded into a green compact under a pressure of 0.1 GPa, and this green compact was sintered in a vacuum at 0.13 Pa and a maintained at a temperature of 1400° C. for 1 hour. Thereby, a cemented carbide post was fabricated that has a maximum diameter of 15 mm, a bottom surface diameter of 13 mm, a length of 20 mm, and has the shape shown in FIG. 2. Experimental example 1 was set on the cemented carbide post described above after interposing a composition (in % by mass) of Ni-14% Cr-3.5% B-4.0% Si-4.5% Fe-0.7% C alloy brazing filler metal having a thickness of 0.35 mm, and bonded by brazing at 1100° C. As shown in FIG. 1, cemented carbide posts were attached to a total of 16 recesses having a depth of 8 mm arranged in a cross-shape on the 240 mm diameter distal surface of the bit body formed by a steel alloy as stipulated in JIS SCM415 after interposing a Cu alloy brazing filler metal having a composition of Cu-40% Ag-6% Sn-2% Ni and a thickness of 35 mm. The drilling tool was fabricated by brazing at 800° C.

Experimental Example for Co Diffusion

As a base material powder, a diamond powder having an average particle diameter of 10 μm and a purity of 99.9% or greater, and as a binding agent, a $MgCO_3$ powder having an average particle diameter of 10 μm and a purity of 95% or greater were prepared.

The $MgCO_3$ powder was made into a green compact having the predetermined dimensions by press molding under a pressure of 100 MPa. Next, this green compact was charged into a capsule made of Ta and the diamond powder was placed on the green compact to fill the capsule. The capsule was placed into a standard ultrahigh pressure belt sintering apparatus. A pressure of 7.7 GPa was applied to the capsule, a temperature of 2250° C. was maintained for 30 minutes, and ultrahigh pressure sintering was carried out to form a plurality of circular sintered diamond elements.

This diamond element has a diameter of 11 mm and a thickness of 1.5 mm, and as a binding agent includes $MgCO_3$ at 4.0% by volume. The upper and lower surfaces of the diamond element were ground by a #200 diamond grindstone to form a circular sintered diamond chip having a diameter of 11 mm and a thickness of 1.25 mm. From the diamond chip, fan-shaped diamond tips having a vertex of 90° were cut out using a laser, and a 0.5 mm chamfering was applied on each of the corners.

At the same time, a circular cemented carbide tip having a diameter of 12.5 mm and a thickness of 2.25 mm, and a circular cemented carbide tip having a diameter of 12.5 mm and a thickness of 1.25 mm were prepared. These tips were formed by a cemented carbide including Co at 10% by mass as the binding agent with the remainder consisting of WC and unavoidable impurities. A fan-shaped recess having a shape conforming to the fan-shaped sintered diamond tip described above was formed in the circular cemented carbide chip having a thickness of 1.25 mm.

A fan-shaped diamond tip was engaged in the fan-shaped recess of the 1.25 mm thick cemented carbide tip after interposing a Co foil having a thickness of 0.1 mm therebetween. This was placed at the center between circular cemented carbide chips having a thickness of 2.25 mm disposed on both sides. These bonding surfaces were overlaid above and below after interposing this Co foil. In this state, they were placed into a standard ultrahigh temperature and pressure belt sintering apparatus to be integrally bonded under a pressure of 5.5 GPa at a temperature of 1450° C. maintained for 30 minutes.

In order to expose the fan-shaped sintered diamond tip (the drilling wear portion), the integral superhard part covering it was removed by using a #200 diamond grindstone, then grinding processing was applied over the whole, and an experimental example 2 having a diameter of 8 mm and a thickness of 3.5 mm was produced.

The bonding interfaces of the experimental example 2 were examined using EPMA, the 0.05 mm Co metal layer was observed at the bonding interface, and the diffusion layers were measured to a depth of 0.01 to 0.05 mm from the bonding interface of the diamond element and to a depth of 0.1 to 3.0 mm from the bonding interface of the cemented carbide element.

Next, a WC powder having an average particle diameter of 1.5 μm, a $Cr_3C_2$ powder having an average particle diameter of 2.3 μm, a ZrC powder having an average particle diameter of 1.3 μm, and a Co powder having an average particle diameter of 3.4 μm were prepared as base material powders. These base material powders were mixed in % by mass at ratios of Co at 9%, $Cr_3C_2$ at 0.4%, ZrC at 0.2%, and the remainder WC, and then they were wet-mixed in a bowl mill for 72 hours. After drying, this mixture was press molded into a green compact under a pressure of 0.1 GPa, and this green compact was sintered in a vacuum at 0.13 Pa and a temperature of 1400° C. maintained for 1 hour. Thereby, a cemented carbide post was fabricated that has a maximum diameter of 15 mm, a bottom surface diameter of 13 mm, a length of 20 mm, and has the shape shown in FIG. 2. Experimental example 2 was set on the cemented carbide post described above after interposing a Ni alloy brazing filler metal having a thickness of 0.35 mm and a composition (in % by mass) of Ni-14% Cr-3.5% B-4.0% Si-4.5% Fe-0.7% C, and bonded by brazing at 1100° C. for 5 minutes. As shown in FIG. 1, cemented carbide posts were attached to a total of 16 recesses having a depth of 8 mm arranged in a cross-shape on the 240 mm distal surface of the bit body formed by a steel alloy as stipulated in JIS SCM 415 after interposing a Cu alloy brazing filler metal having a thickness of 35 mm and a composition of Cu-40% Ag-6% Sn-2% Ni. The drilling tool was fabricated by brazing at 800° C.

Experimental Example for Ta diffusion

As a base material powder, a diamond powder having an average particle diameter of 10 μm and a purity of 99.9% or greater, and as a binding agent, a $MgCO_3$ powder having an average particle diameter of 10 μm and a purity of 95% or greater were prepared.

The $MgCO_3$ powder was made into a green compact having the predetermined dimensions by press molding under a pressure of 100 MPa. Next, this green compact was charged into a capsule made of Ta and diamond powder was placed on the green compact to fill the capsule. The capsule was placed into a standard ultrahigh pressure belt sintering apparatus. A pressure of 7.7 GPa was applied to the capsule, a temperature of 2250° C. was maintained for 30 minutes, and ultrahigh pressure sintering was carried out to form a plurality of circular sintered diamond elements.

This diamond element has a diameter of 11 mm and a thickness of 1.5 mm, and as a binding agent includes $MgCO_3$ at 4.0% by volume. The upper and lower surfaces of the diamond element were ground by a #200 diamond grindstone to form a circular sintered diamond chip having a diameter of 11 mm and a thickness of 1.25 mm. From the diamond chip, fan-shaped diamond tips having a vertex of 90° were cut out using a laser, and a 0.5 mm chamfering was applied on each of the corners.

At the same time, a circular cemented carbide tip having a diameter of 12.5 mm and a thickness of 2.25 mm, and a circular cemented carbide chip having a diameter of 12.5 mm and a thickness of 1.25 mm were prepared. These tips were formed by a cemented carbide including Co at 10% by mass as the binding agent with the remainder consisting of WC and unavoidable impurities. A fan-shaped recess having a shape conforming to the fan-shaped sintered diamond tip described above was formed in the circular cemented carbide tip having a thickness of 1.25 mm.

A fan-shaped diamond tip was engaged in the fan-shaped recess of the 1 mm cemented carbide tip after interposing a Ta foil having a thickness of 0.05 mm therebetween. This was placed at the center between circular cemented carbide tips having a thickness of 2.25 mm disposed on both sides, and these bonding surfaces were overlaid above and below after interposing this metal foil. In this state, they were set into a standard ultrahigh temperature and pressure belt sintering machine to be integrally bonded under a pressure of 6 GPa at a temperature of 1500° C. maintained for 30 minutes.

In order to expose the fan-shaped sintered diamond tip, the integral superhard part covering it was removed by using a #200 diamond grindstone, then grinding processing was applied over the whole, and an experimental example 3 having a diameter of 8 mm and a thickness of 3.5 mm was produced.

The bonding interfaces of the experimental example 3 were examined using EPMA, the 0.03 mm Ta metal layer was observed at the bonding interface, and the diffusion layers were measured to a depth of 0.005 to 0.01 mm from the bonding interface of the diamond element and to a depth of 0.01 to 0.05 mm from the bonding interface of the cemented carbide element.

Next, a WC powder having an average particle diameter of 1.5 μm, a $Cr_3C_2$ powder having an average particle diameter of 2.3 μm, a ZrC powder having an average particle diameter of 1.3 μm, and a Co powder having an average particle diameter of 3.4 μm were prepared as base material powders. These base material powders were mixed in % by mass at ratios of Co at 9%, $Cr_3C_2$ at 0.4%, ZrC at 0.2%, and the remainder WC, and they were wet-mixed in a bowl mill for 72 hours. After drying, this mixture was press molded into a green compact under a pressure of 0.1 GPa, and this green compact was sintered in a vacuum at 0.13 Pa and a temperature of 1400° C. maintained for 1 hour. Thereby, a cemented carbide post was fabricated that has a maximum diameter of 15 mm, a bottom surface diameter of 13 mm, a length of 20 mm, and has the shape shown in FIG. 2. Experimental example 3 was set on the cemented carbide post described above after interposing a Ni alloy brazing filler metal having a thickness of 0.35 mm and a composition (in % by mass) of Ni-14% Cr-3.5% B-4.0% Si-4.5% Fe-0.7% C, and bonded by brazing at a temperature of 1100° C. for 5 minutes. As shown in FIG. 1, cemented carbide posts were attached to a total of 16 recesses having a depth of 8 mm arranged in a cross-shape on the 240 mm distal surface of the bit body formed by a steel alloy as stipulated in JIS SCM 415 after interposing a Cu alloy brazing filler metal having a thickness of 0.35 mm and a composition of Cu-40% Ag-6% Sn-2% Ni. The drilling tool was fabricated by brazing at 800° C.

FIELD OF INDUSTRIAL APPLICABILITY

The bonding structure between the cemented carbide element and the diamond element according to the present invention can be applied, for example, to a cutting tip of a drilling tool. In this case, the cutting tip shows superior resistance to chipping under high-speed revolution operation conditions of the drilling tool, and exhibits superior wear resistance over a long period of time. Therefore, reduction of drive power, energy reduction, and cost reduction in the drilling operation can be promoted.

What is claimed is:

1. A cutting tip, comprising:
   a cemented carbide cutting base;
   a diamond element supported by said cutting base; and
   a bonding layer formed between said cutting base and said diamond element in order to bond them;
   wherein said bonding layer includes a diffusion layer in which one or two or more metals selected from a group consisting of Fe, Ni, Co, Ti, Zr, W, V, Nb, Ta, Cr, Mo, and Hf diffuses into at least one of said cemented carbide or said diamond, and
   when a cross-section in a transverse direction of said bonding layer is line analyzed using EPMA, the maximum value of a content of said metals in said cross section is 20 times or greater than an average value of a content of said metals in a region of the cemented carbide element not influenced by the diffusion, and 100 times or greater than an average value of a content of said metal in a region of said diamond element not influenced by the diffusion.

2. A cutting tip according to claim 1, wherein said bonding layer includes a diffusion layer in which at least one of Fe and Ni diffuse into said diamond.

3. A cutting tip according to claim 1, wherein said bonding layer includes a diffusion layer in which Co diffuses into said diamond, and a Co layer.

4. A cutting tip according to claim 1, wherein said bonding layer includes a diffusion layer in which one or two or more metals selected from a group consisting of Ti, Zr, W, V, Nb, Ta, Cr, Mo, or Hf diffuses into at least one of said cemented carbide or said diamond.

5. A cutting tip according to claim 1, wherein said diamond element is a high heat resistant sintered diamond including a binder phase of 0.1 to 15% by volume, where said binder phase is formed by one or two or more selected from the group consisting of carbonates of Mg, Ca, Sr, and Ba, oxides of Mg, Ca, Sr, and Ba, complex carbonates and complex oxide containing two or more thereof.

* * * * *